No. 628,030. Patented July 4, 1899.
E. A. PARKER.
METHOD OF PERFORATING GLASS ARTICLES.
(Application filed Nov. 16, 1898.)
(No Model.)

WITNESSES
H. A. Lamb
S. V. Kley

INVENTOR
Edmund A. Parker
By
A. M. Wooster
Atty.

UNITED STATES PATENT OFFICE.

EDMUND A. PARKER, OF MERIDEN, CONNECTICUT.

METHOD OF PERFORATING GLASS ARTICLES.

SPECIFICATION forming part of Letters Patent No. 628,030, dated July 4, 1899.

Application filed November 16, 1898. Serial No. 696,608. (No model.)

*To all whom it may concern:*

Be it known that I, EDMUND A. PARKER, a citizen of the United States, residing at Meriden, county of New Haven, State of Connecticut, have invented a new and useful Method of Perforating Glass Articles, of which the following is a specification.

My invention has for its object to devise a novel method of making glass-topped condiment-holders which will render drilling unnecessary, will avoid breakage, will enable the manufacturer to make the perforations large or small, as may be required, and which shall be so inexpensive that it will not add appreciably to the cost of manufacture.

It is of course well understood that salt will oxidize any metal with which it comes in contact, so that in damp weather the salt becomes quickly unfit for use and the article in which it is contained is rendered unsightly. These difficulties may be avoided by the use of glass only in the manufacture of articles required to be non-oxidizable. It has been impossible, however, heretofore to produce low-priced all-glass salts on account of the difficulty of perforating the glass, this operation as heretofore performed having been found expensive and unsatisfactory in the manufacture of individual salts. In order to overcome these objections and render it possible to place upon the market individual salts costing no more than the ordinary individual salts now upon the market, but which, unlike those heretofore in use, shall be absolutely non-oxidizable, owing to the fact that it is made impossible for the salt to come in contact with anything except glass, either in filling or in use, in any position in which the article can be placed, I have devised the novel method of making the same, of which the following description, in connection with the accompanying drawings, is a specification, letters and numbers being used to designate the several parts.

Figure 1:
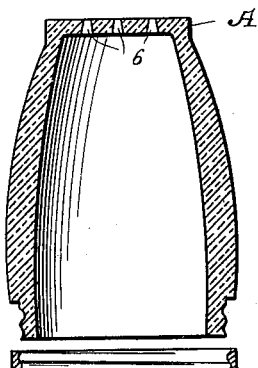
Figure 2:
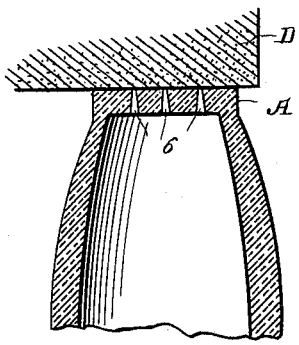
Figure 3:
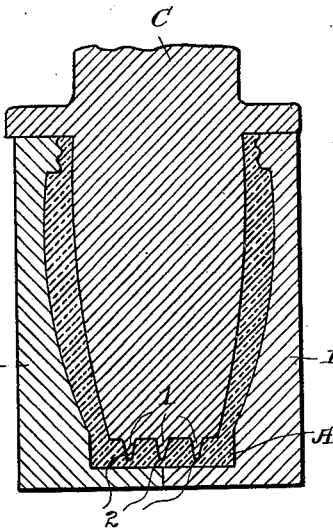
Figure 4:
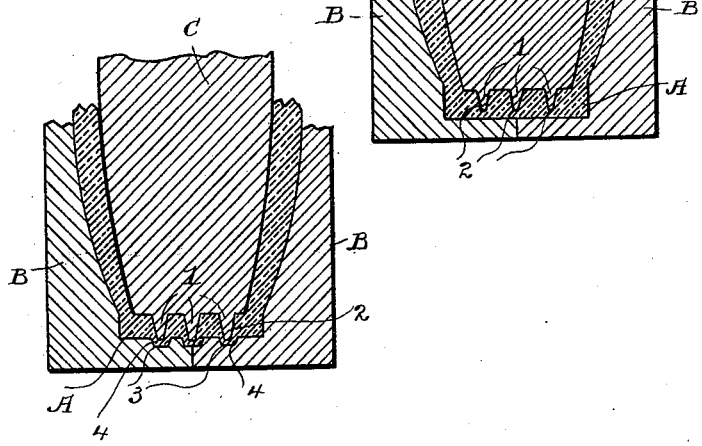

Figures 1 and 2 are sectional views illustrating the application of my novel method of perforating glass articles in the manufacture of individual salts and peppers in which the top and body are molded integral, the glass bottom and a metallic screw-ring, by which it may be attached to the body, being shown in Fig. 1 and a portion of a grinding-wheel appearing in Fig. 2. Figs. 3 and 4 are sectional views illustrating the manner in which the body and top of an individual salt or pepper are formed in the mold and the indentations are made in the top preparatory to the grinding operation.

A denotes the integral top of an individual salt or pepper, B the parts of a mold in which the article is formed, and C a plunger which presses the plastic material into the mold and, in connection with the mold, forms the article to the desired shape. At the lower end of the plunger I place one or more tapering teats or projections 1, which are forced into the glass while in the mold.

It will of course be understood that in the art of molding glass articles a sufficient quantity of glass in a plastic condition to form the article is placed in the mold, the molten glass being sufficiently plastic to take readily any form it may be desired to impart to it. When, therefore, a sufficient quantity of molten glass has been placed in the mold and the plunger has been forced down to place, it is obvious that the projections upon the plunger will be forced into the mass of molten glass and will form indentations 2 therein.

In Fig. 3 I have illustrated an application of the principle of my invention in which the bottom of the mold is left perfectly flat.

Fig. 4 shows a form in which the bottom of the mold is provided with depressions 3, which register with the projections 1 on the plunger, so that when the projections are forced down into the mass of molten glass the glass itself will be forced into the depressions, and blisters, lumps, or projections 4 will be formed upon the outer face of the article.

It will be noticed that in all forms I have shown the projections on the plunger as made tapering. This shape is preferable in order to give ample strength, so that there will be no danger of the projections breaking in use, and is, furthermore, of advantage in that it enables me to form tops for either peppers or salts in the same mold.

After the molded article has become set and hardened the operation of forming the perforations 6 therein is completed by grinding off the outer face of the article, as indicated in Fig. 2, in which I have indicated a grinding-stone by D. In case the projections upon the plunger have not passed through the article or have not even raised blisters or projections thereon, as illustrated in Fig. 3, the entire surface of the article is ground off upon the wheel until the indentations are intersected and the perforations 6 are of the desired size. In the manufacture of peppers the perforations are left quite small, and in the manufacture of salts more of the surface is ground off until the perforations are the required size for salt. The principle of operation is the same where the projections on the plunger are caused to pass entirely through the article or to raise blisters or projections on the outer face thereof, it being simply necessary in either case to grind off the outer face of the article sufficiently so that the perforations will be of the required size.

By my method I am enabled to manufacture either a "pepper" or a "salt" from a single product of the molds by simply grinding more or less off the top.

Having thus described my invention, I claim—

1. The herein-described method of making glass-topped condiment-holders which consists in internally indenting the top of the article simultaneously with the formation of the sides and the said top while the glass is in a plastic condition in the mold, and then grinding off the outer face of the top until the indentation is reached and the perforation is the required size.

2. The method of making glass-topped condiment-holders which consists in forming tapering indentations in the inner side of the top simultaneously with the formation of the sides and the said top while the glass is in a plastic condition in the mold and then grinding off the outer face of the top until the indentations are intersected thereby forming openings of any required size.

In testimony whereof I affix my signature in presence of two witnesses.

EDMUND A. PARKER.

Witnesses:
 W. E. ROGERS,
 JOHN F. WILLIAMS.